United States Patent
Cohen et al.

[11] Patent Number: 5,847,957
[45] Date of Patent: Dec. 8, 1998

[54] WEB ACCESS FOR A MANUFACTURING EXECUTION SYSTEM

[75] Inventors: Harvey I. Cohen, Huntingdon Valley; James V. McCusker, Souderton, both of Pa.

[73] Assignee: Base Ten Systems, Inc., Trenton, N.J.

[21] Appl. No.: 876,606

[22] Filed: Jun. 16, 1997

[51] Int. Cl.[6] ............................. G06F 17/00; G06F 11/00; G06F 13/14

[52] U.S. Cl. ................................ 364/468.15; 395/200.33; 395/200.49; 707/10; 707/50

[58] Field of Search ........................ 364/468.01, 468.15; 395/200.3, 200.48, 200.49, 200.33; 707/10, 501

[56] References Cited

U.S. PATENT DOCUMENTS

| | | | |
|---|---|---|---|
| 5,732,218 | 3/1998 | Bland et al. | 395/200.54 |
| 5,742,762 | 3/1998 | Scholl et al. | 395/200.3 |
| 5,752,246 | 5/1998 | Rogers et al. | 707/10 |
| 5,754,772 | 5/1998 | Leaf | 395/200.33 |
| 5,764,906 | 6/1998 | Edelstein et al. | 395/200.49 |
| 5,768,510 | 6/1998 | Gish | 395/200.33 |
| 5,774,670 | 6/1998 | Montulli | 395/200.57 |

*Primary Examiner*—Paul P. Gordon
*Attorney, Agent, or Firm*—Sprung Kramer Schaefer & Briscoe

[57] ABSTRACT

A method for remotely accessing batch status information from a manufacturing execution system, wherein a web page server is provided which is connected to a manufacturing execution system network and to a digital network. The web page server is accessed over the digital network using a web browser program and downloads a batch status review query program as a web applet from the web page server. The web applet is run within the web browser program to access data from the manufacturing execution system network via the web page server to obtain batch status and inventory information.

6 Claims, 1 Drawing Sheet

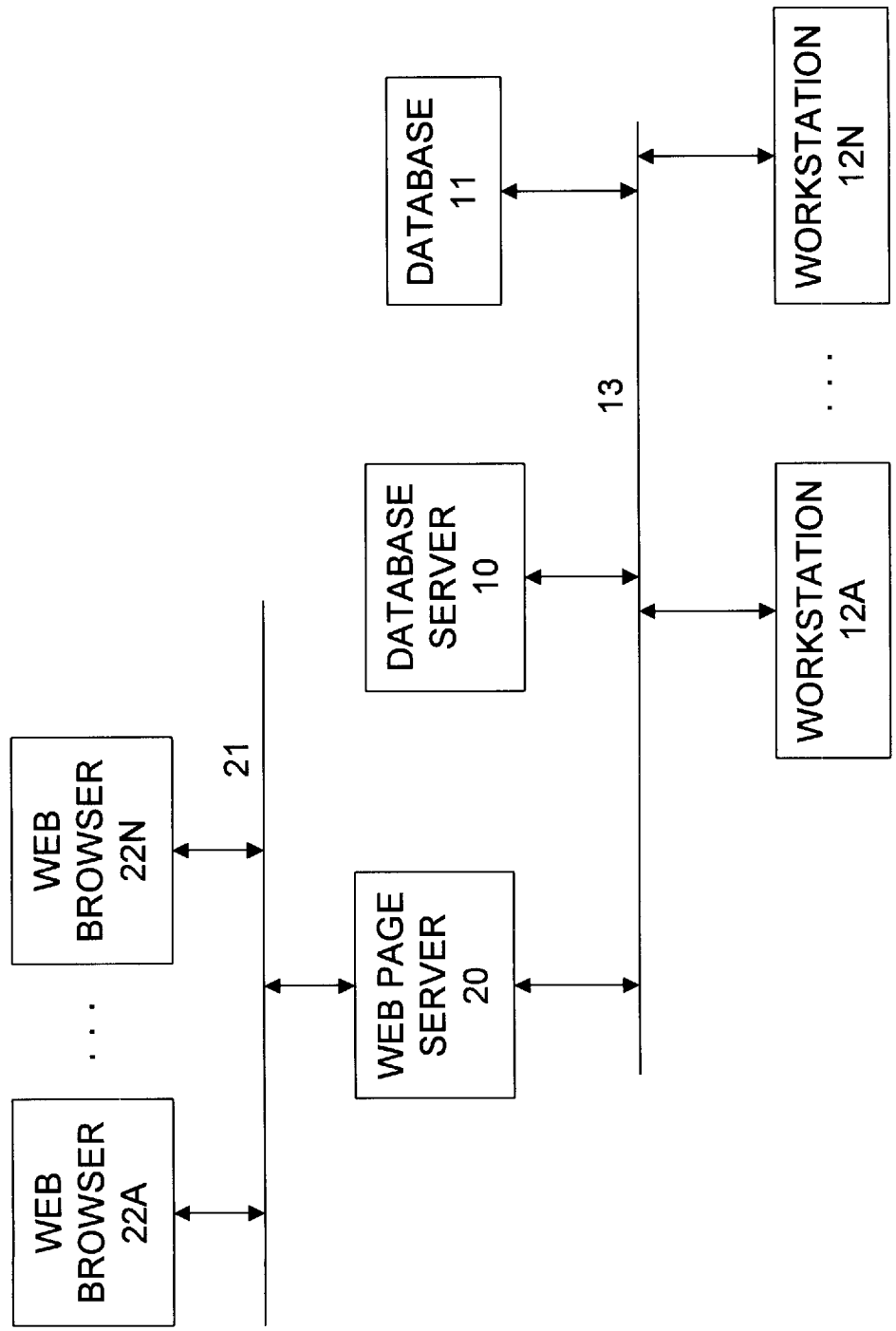

WEB ACCESS FOR A MANUFACTURING EXECUTION SYSTEM

BACKGROUND OF THE INVENTION

The present invention relates to a manufacturing execution system and specifically to a method for remotely accessing batch status information from the manufacturing execution system.

Manufacturing execution systems have been designed to control the manufacture of food products, pharmaceuticals, mechanical and electronic equipment, chemical compositions, etc., particularly in regulated industries, since they reduce paperwork and increase the ease in which the company can retain compliant status. The systems generally maintain a database of information which controls and supports the production process, and these systems record event data relating to particular events in the manufacturing process and support data.

While it is possible to access information relating to the production of a particular batch of material in the manufacturing execution system, remote access of such information is not possible because of software incompatibilities and because of security problems.

SUMMARY OF THE INVENTION

The main object of the present invention is to provide intranet or Internet World Wide Web access to the customers of the manufactures using manufacturing execution systems.

Another object of the present invention is to provide a way in which to achieve multi-platform software compatibility for remote access.

A further object of the present invention is to provide adequate security to prevent access of the confidential information by authorized persons.

These and other objects of the present invention are achieved in accordance with the present invention by providing a limited manufacturing execution system batch status review query program, which is developed and configured as a small web applet. The web applet would automatically be downloaded by any standard web browser, such as Microsoft Internet Explorer or Netscape Navigator.

According to the invention, each manufacturing execution system would have a separate web page server connected to the bus of a manufacturing execution system and to the Internet or an intranet. The web page server establishes a manufacturing execution system web site that can be accessed via the intranet or the Internet or both. End user browsers would then access the web page server over the company intranet or the Internet and obtain only the information that should be seen by that user in order to protect against direct access to the database server and the manufacturing execution system.

As a result of this system, any worldwide web browser on any personal computer platform, such as Macintosh, Windows 95, Windows NT, DOS, etc., would then have access to the manufacturing execution system in a controlled manner. The administrator of the manufacturing execution system would give selected customers the required access passwords which would enable them to view the status of their batches and/or orders including inventory information being tracked by the manufacturing execution system. These customers would not have access to any other information nor any other customer's information.

The applet that is downloaded to each web browser would be written in JAVA or the like so that it could be operated on any platform having a running web browser. The applet will force the user to have a online first time use registration and subsequent log-on procedures and provide an audit trail at the web page server for possible billing purposes.

Moreover, users of the system can create HTML documents in order to display the data obtained from the manufacturing execution system.

These and other features and advantages of the present invention are achieved in accordance with the present invention by a method for remotely accessing batch status information from a manufacturing execution system, as shown in the attached drawing, wherein:

BRIEF DESCRIPTION OF THE DRAWING

The FIGURE is a schematic representation of the system for carrying out the method according to the present invention.

DETAILED DESCRIPTION OF THE INVENTION

In a manufacturing execution system such as the one shown in the FIGURE, various workstations 12A–12N are distributed throughout the production system and control various functions of the manufacturing execution system, such as receiving and inventory management, dispensing, quality control, scheduling, resource management, equipment management, human resources management, security, production positions, waste management and facility and equipment monitoring and control. Data from each of the workstations 12A–12N is stored in the database 11 under the control of the manufacturing execution system database server 10, all communicating over a central bus 13, thereby constituting a network.

The database 11 can be stored in a memory which can be an optical memory, a semiconductor memory, a magnetic memory or other conventional memories that are presently available. The server in workstations are preferably microcomputers, such as those using the Pentium microprocessor or the Pentium PC processor.

In the manufacturing execution system, data is entered at each workstation under the control of the system software and user defined rules for each data field that will be stored in records in the database 11. For example, for the production of a pharmaceutical composition, a master production control record must be defined, which includes a recipe of the materials, steps, people and equipment needed for the manufacturing execution process. Various fields for the master production control record for each item to be manufactured would include an identification number for the record, an identification number for the item to be produced, the batch size, a list of components to use, a list of processes to perform, a description of each step of production, controls to be made, the identification of the operator, a list of the qualifications for each step of production, how the product is to be handled, the labeling for the product, operating procedures for sampling, testing and production.

The distributed workstations control each of the functions that are being carried out in the system. The results of each function or step in the process of the manufacturing is stored in the database 11 under the control of the server 10.

There are many instances where the customer of the manufacturer is interested in finding out the status of the manufacturing process of a particular batch of material including inventory information. The customer is usually remotely situated from the manufacturing execution system network.

In order to provide access to that data on a limited basis so that a particular customer can only see the data relating to that customer's batches of materials, an additional web page server 20 is added to the system and which is connected to the bus 13. The web page server 20 establishes a manufacturing execution system web site which can be accessed via a digital network 21. This digital network can be a company intranet to which a customer has access through web browsers 22A–22N directly or via the Internet, or it can be connected to the World Wide Web of the Internet to which anyone can have access through an Internet service provider via a modem or other conventional devices.

The customer can then access the web site of the web page server 20 over the intranet or Internet 21 via web browsers 22A–22N which can be any conventionally programmed computer or the like having an operating web browser program, such as Microsoft Internet Explorer or Netscape Navigator.

When the web browser 22A accesses the web site of the web page server 20, a limited manufacturing execution system batch status review query program configured as a small web applet is automatically downloaded by the web browser.

The web browser then runs the applet, as it does with other applets that are downloaded from various Internet web sites, and require that the customer provide an access password. The passwords, which are distributed by the administrator of the manufacturing execution system network or the web page server 20, would only provide access to information corresponding to that customer based upon the access password. Moreover, the applet would require the user to do a first time use registration and subsequent log-ons and thus provide an audit trail for security purposes and for possible billing.

As desired, the user can create additional HTML compliant documents in order to display the manufacturing execution system data that is obtained from the database server 10 via the web page server 20.

As a result of this system and method, there is no direct access to the manufacturing execution system network by a customer, because the web page server 20 acts as a firewall and permits only limited access to information, so that the system is secure. Moreover, the applet only allows the customer to have access to the information relevant to that customer.

Furthermore, since the web applet written in JAVA can be read by any standard web browser, such as Microsoft Internet Explorer or Netscape Navigator for which there are versions for virtually any platform, there is software compatibility for obtaining the information without the need for the manufacturing execution system software to be running in a remote accessing computer.

A web browser running on any computer platform would then have access to the manufacturing execution system in a controlled manner. The manufacturing execution system web site would give selected customers the required access to enable them to view the status of batches and/or orders being tracked by the manufacturing execution system including inventory information.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for remotely accessing batch status information from a manufacturing execution system, comprising the steps of:

providing a web page server connected to a manufacturing execution system network and to a digital network;

accessing the web page server over the digital network using a web browser program and downloading a batch status review query program as a web applet from the web page server; and running the web applet within the web browser program to access data from the manufacturing execution system network via the web page server to obtain batch status information.

2. The method according to claim 1, wherein the digital network is an intranet.

3. The method according to claim 1, wherein the digital network is the Internet.

4. The method according to claim 1, wherein the applet comprising logging on a user, receiving a password and assigning access to selected information based upon the password information.

5. The method according to claim 4, wherein the web page server maintains an audit trail of batch status queries.

6. The method according to claim 1, further comprising creating HTML documents to display batch status information from the web page server.

\* \* \* \* \*